No. 746,098. PATENTED DEC. 8, 1903.
F. KEENER.
BUG GATHERER.
APPLICATION FILED SEPT. 17, 1903.
NO MODEL.
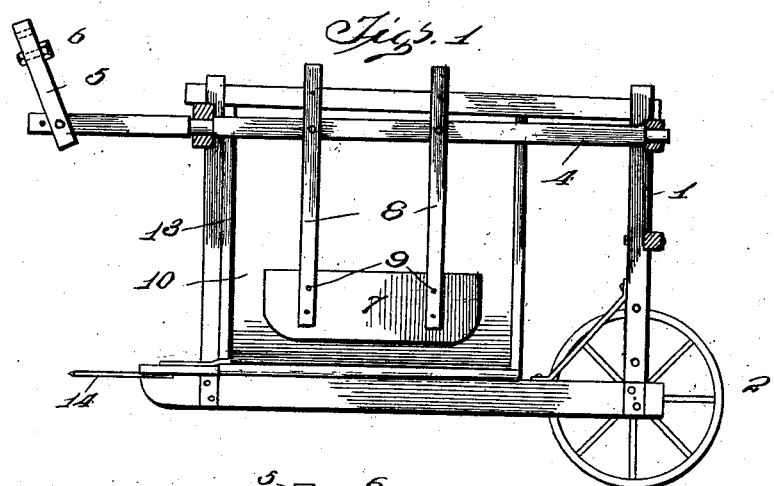
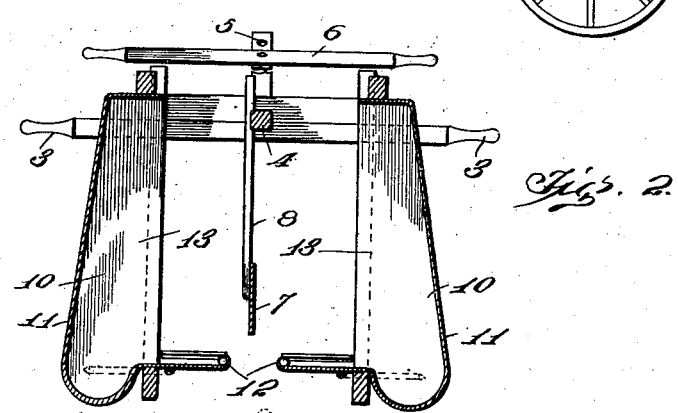
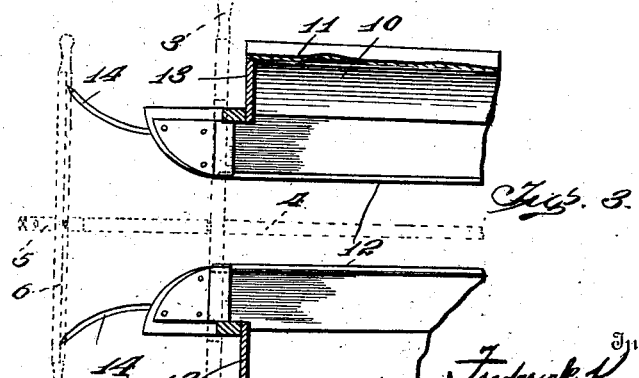

No. 746,098. Patented December 8, 1903.

UNITED STATES PATENT OFFICE.

FREDERICK KEENER, OF JEDDO, MICHIGAN.

BUG-GATHERER.

SPECIFICATION forming part of Letters Patent No. 746,098, dated December 8, 1903.

Application filed September 17, 1903. Serial No. 173,578. (No model.)

*To all whom it may concern:*

Be it known that I, FREDERICK KEENER, a citizen of the United States, residing at Jeddo, in the county of St. Clair and State of Michigan, have invented certain new and useful Improvements in Bug-Gatherers; and I do hereby declare the following to be a full, clear, and exact description of the invention, such as will enable others skilled in the art to which it appertains to make and use the same.

My invention relates to machines for gathering bugs, and is particularly designed and adapted for use in gathering potato-bugs.

In devising the present invention I have endeavored to construct a machine which will be light and durable and which can be drawn and operated by one or more operators without the aid of horse-power and which will be very effective in its operation.

In some devices which have been constructed the arrangement is such that the front end of the machine strikes the bushes or plants before the same are struck by the beater, which causes the insects to fall off of the bushes without being caught. In my present invention the parts are so constructed and arranged that the bushes will be guided into the machine, and by operating the beater the insects will be knocked or probably, more accurately speaking, wiped off of the plants by the vibrating movement of the beater, the beater being so constructed as to move in the arc of a circle, so that it moves upwardly on its back-and-forth strokes, which tends to wipe the bugs off of the plants and deliver them in the receptacles arranged to receive the same.

Another object of my invention is to so construct the machine that it can be pulled along by the operator grasping a suitable handle provided on the same with one hand and with the other hand vibrate the beater to deliver the insects first on one side and then on the other side of the machine into the receptacle designed to receive the same.

In the accompanying drawings, Figure 1 is a longitudinal vertical section through my improved bug-gathering machine. Fig. 2 is a transverse section through the same. Fig. 3 is a horizontal section through a portion of the machine and showing more particularly the front end thereof and a portion of the receptacles for the bugs.

1 in the drawings represents a suitable framework, to which is attached at its lower rear ends two traction-wheels 2 2. At the upper front end of the framework 1 are provided handles 3 3, one on each side of the machine. Extending longitudinally of the framework and arranged centrally thereof is journaled a shaft 4, which is pivoted at the front and rear of the framework in the upper portion of said frame. Attached to said shaft 4 is a diagonally-extending rod 5, to which latter is pivoted an operating handle or rod 6, which extends on opposite sides of the shaft 4 and within close proximity of the handles 3 3, so that an operator can grasp one of the handles with one of his hands to draw the machine along and with his other hand can vibrate the shaft 4, or where two operators are employed each can work on opposite sides of the machine and draw the machine along with one hand and jointly grasp opposite ends of the operating rod or handle 6, and thus vibrate the shaft 4. The shaft 4 carries a depending beater 7, which is connected to the said shaft by means of straps 8 8. The said straps are provided with adjusting-holes 9 9, by means of which the beater is raised or lowered to suit different-sized plants. Two receptacles 10 10, one on each side of the machine, are provided for receiving and holding the bugs knocked from the plants. These receptacles extend substantially the entire height of the framework, and each is provided with a back wall 11, which is preferably constructed of sheet metal and which is extended in a curved manner to form the bottom of the receptacle and then forward a considerable distance within the interior of the framework, so as to bring the inner ends 12 12 of each receptacle within close proximity of each other, leaving just sufficient space for the plants to pass between the same and to permit the bush part of the plant to extend over each projecting edge of the receptacles. The inner edges of the ends 12 12 are curved upwardly and backwardly and are preferably strengthened by means of rods passed through the same. Each receptacle is also provided with end walls 13 13, the end walls, together with the back and bottom walls, forming a closed receptacle, which receives the bugs and prevents their escape. At the front end of the machine are also provided guide-rods 14 14, which assist in directing the plants into the machine to facilitate the beating operation.

It will be observed that the beater is moved in the arc of a circle, which gives an upward movement to the beater, and by being comparatively long strikes the plant at a point near the ground, and that the beater in moving back and forth bends the plants over the projecting ends 12 12 of the bug-retaining receptacles and sweeps or wipes the bugs off of the plant on its upward stroke and at the same time sweeps the bugs well into the receptacles, the movement of the beater being an up-and-down stroke, by reason of which movement the bugs must necessarily be thoroughly removed from the plant and be forced into the receptacles.

The framework of the machine may be suitably strengthened by means of braces and tie-rods in a suitable manner.

Having now described my invention, what I claim as new, and desire to secure by Letters Patent, is—

1. In a bug-gatherer, the combination with a suitable framework, traction-wheels located at the rear end of the framework, handles provided at the forward end of the framework and extending laterally therefrom, bug-receptacles extending longitudinally thereof substantially the entire height and length of the said framework, and inclosed at its sides, back, and bottom, a vibrating beater arranged centrally and longitudinally of the framework and attached to a shaft journaled in the framework, and an operating-rod attached to said shaft and extending laterally therefrom within close proximity to the draft-handles of the machine.

2. In a bug-gatherer, the combination with a suitable framework, traction-wheels provided at the rear end thereof, draft-handles provided at the front end of the framework, bug-receptacles arranged lengthwise of the framework and opposite each other, said receptacles being inclosed at the sides, back, and bottom and projecting a considerable distance inwardly so as to leave a comparatively narrow space for the passage of the plants between them, the inner ends of the receptacles being bent upwardly and backwardly, a beater arranged longitudinally of the machine and in line with the bug-receptacles, and a laterally-projecting operating-rod connected to the beater and extending within close proximity to the draft-handles of the machine.

In testimony whereof I hereunto affix my signature in presence of two witnesses.

FREDERICK KEENER.

Witnesses:
MARTHA HENRY,
ANNA M. PAPST.